(12) United States Patent
Sommerfield et al.

(10) Patent No.: US 7,418,449 B2
(45) Date of Patent: Aug. 26, 2008

(54) SYSTEM AND METHOD FOR EFFICIENT ENRICHMENT OF BUSINESS DATA

(75) Inventors: Daniel A. Sommerfield, San Mateo, CA (US); Hinrich H. Schuetze, San Francisco, CA (US); Stan Stukov, Hillsborough, CA (US)

(73) Assignee: ENKATA Technologies, San Mateo, CA (US)

( * ) Notice: Subject to any disclaimer, the term of this patent is extended or adjusted under 35 U.S.C. 154(b) by 348 days.

(21) Appl. No.: 10/898,715

(22) Filed: Jul. 22, 2004

(65) Prior Publication Data

US 2005/0060340 A1 Mar. 17, 2005

Related U.S. Application Data

(60) Provisional application No. 60/490,219, filed on Jul. 25, 2003.

(51) Int. Cl.
*G06F 7/00* (2006.01)
(52) U.S. Cl. ...................................... 707/100
(58) Field of Classification Search .................. 707/100
See application file for complete search history.

(56) References Cited

U.S. PATENT DOCUMENTS

| 6,922,466 | B1 * | 7/2005 | Peterson et al. | ........... 379/88.09 |
| 2003/0149586 | A1 * | 8/2003 | Chen et al. | ..................... 705/1 |

OTHER PUBLICATIONS

Cohn et al., Active learning with statistical models. Journal of Artificial Intelligence Research, 4, pp. 129-145, 1996.
Evans et al., Methods for Approximating Integrals in Statistics with Special Emphasis on Bayesian Integration Problems. Statistical Science 10(3), pp. 254-272.
Fukunaga, K., Introduction to Statistical Pattern Recognition, 2nd Ed. Academic Press, 1990, pp. 254-300.
Joachims, T.. A statistical learning model of text classification for support vector machines. AC-SIGIR 2001.
Lewis et al., A sequential algorithm for training text classifiers. Proceedings of the Seventeenth Annual International ACM-SIGIR Conference on Research and Development in Information Retrieval. pp. 3-12, 1994.
Roy et al., Toward optimal active learning through sampling estimation of error reduction. Proceedings of the Eighteenth International Conference on Machine Learning, 2001.

(Continued)

*Primary Examiner*—Chong H Kim
(74) *Attorney, Agent, or Firm*—Townsend and Townsend and Crew LLP

(57) ABSTRACT

A method for loading data into a datamart. The method includes identifying business data in a first format from a real business process and identifying a desired second format. The method includes designing a transformation algorithm that transforms the business data in the first format into the second format and implementing the transformation algorithm in computer executable code. The method includes running the computer executable code on business data in the first format and generating business data in the second format and storing the business data in the second format in a datamart.

25 Claims, 7 Drawing Sheets

OTHER PUBLICATIONS

Seung et al., Query by committee. Proceedings of the Fifth Annual ACM Workshop on Computational Learning Theory, pp. 287-294, 1992.

Tong et al., Support vector machine active learning with applications to text classification. Proceedings of the Seventeenth International Conference on Machine Learning, 2000.

* cited by examiner

SYSTEM AND METHOD FOR EFFICIENT ENRICHMENT OF BUSINESS DATA

CROSS REFERENCE TO RELATED APPLICATIONS

This application claims priority to U.S. Provisional Application No. 60/490,219 entitled "SYSTEM AND METHOD FOR EFFICIENT ENRICHMENT OF BUSINESS DATA", and filed on Jul. 25, 2003, and incorporated herein by reference. This application is also related to U.S. application Ser. Nos. 10/895,624 filed Jul. 20, 2004, Ser. No. 10/890,018 filed July 12, 2004, and Ser. No. 10/891,892 filed Jul. 14, 2004, which are also incorporated by reference herein, and each of which claims priority to U.S. Provisional Application No. 60/490,219 entitled "SYSTEM AND METHOD FOR EFFICIENT ENRICHMENT OF BUSINESS DATA", and filed on Jul. 25, 2003.

BACKGROUND OF THE INVENTION

The present invention relates generally to supporting business decisions through data analysis by way of enriching data through data mining, text mining, and automatic classification. More particularly, the invention provides a method and system for 1) automatic detection of change in the business processes to be analyzed; 2) accurate measurement of the performance of automatic classification of business process data; 3) automatic handling of semi-structured text in business process analysis; and 4) efficient and maintainable scripting of the data enrichment process. Business decisions generally require knowledge about properties of business entities related to the decision. Such properties can be inferred by an automatic classifier that processes data associated with the entity. Parts of the data may be human-generated or free form text. Other parts of the data may be machine-generated or semi-structured. It is beneficial to analyze both free form text and semi-structured text data for business process analysis. While the enrichment process can be programmed in a number of existing programming languages and data base query languages, it is advantageous to provide a specialized language for increased maintainability and faster development of the enrichment process. By way of example for the enabling features of such a language, we describe SQXML, a language developed by Enkata Technologies, Inc. for this purpose. The business decision can relate to marketing, sales, procurement, operations, or any other business area that generates and captures real data in electronic form. Merely by way of example, the invention is applied to processing data from a health care service provider. But it would be recognized that the invention has a much wider range of applicability. For example, the invention can be applied to other operational and non-operational business areas such as manufacturing, financial services, telecommunications, insurance services, high technology, retail, consumer products, and the like.

Common goals of almost every business are to increase profits and improve operations. Profits are generally derived from revenues less costs. Operations include manufacturing, sales, service, and other features of the business. Companies have spent considerable time and effort to control costs to improve profits and operations. Many such companies rely upon feedback from a customer or detailed analysis of company finances and/or operations. Most particularly, companies collect all types of information in the form of data. such information includes customer feedback, financial data, reliability information, product performance data, employee performance data, and customer data.

With the proliferation of computers and databases, companies have seen an explosion in the amount of information or data collected. Using telephone call centers as an example, there are literally over one hundred million customer calls received each day in the United States. Such calls are often categorized and then stored for analysis. Large quantities of data are often collected. Unfortunately, conventional techniques for analyzing such information are often time consuming and not efficient. That is, such techniques are often manual and require much effort.

Accordingly, companies are often unable to identify certain business improvement opportunities. Much of the raw data including voice and free-form text data are in unstructured form thereby rendering the data almost unusable to traditional analytical software tools. Moreover, companies must often manually build and apply relevancy scoring models to identify improvement opportunities and associate raw data with financial models of the business to quantify size of these opportunities. An identification of granular improvement opportunities would often require the identification of complex multi-dimensional patterns in the raw data that is difficult to do manually.

Examples of these techniques include statistical modeling, support vector machines, and others. These modeling techniques have had some success. Unfortunately, certain limitations still exist. That is, statistical classifiers must often be established to carry out these techniques. Such statistical classifiers often become inaccurate over time and must be reformed. Conventional techniques for reforming statistical classifiers are often cumbersome and difficult to perform. Although these techniques have had certain success, there are many limitations.

From the above, it is seen that techniques for processing information are highly desired.

SUMMARY OF THE INVENTION

According to the present invention, techniques for processing data are provided. More particularly, the invention provides a method and system for 1) automatic detection of change in the business processes to be analyzed; 2) accurate measurement of the performance of automatic classification of business process data; 3) automatic handling of semi-structured text in business process analysis; and 4) efficient and maintainable scripting of the data enrichment process. Business decisions generally require knowledge about properties of business entities related to the decision. Such properties can be inferred by an automatic classifier that processes data associated with the entity. Parts of the data may be human-generated or free form text. Other parts of the data may be machine-generated or semi-structured. It is beneficial to analyze both free form text and semi-structured text data for business process analysis. While the enrichment process can be programmed in a number of existing programming languages and data base query languages, it is advantageous to provide a specialized language for increased maintainability and faster development of the enrichment process. By way of example for the enabling features of such a language, we describe SQXML, a language developed by Enkata Technologies, Inc. for this purpose. The business decision can relate to marketing, sales, procurement, operations, or any other business area that generates and captures real data in electronic form. Merely by way of example, the invention is applied to processing data from a health care service provider.

But it would be recognized that the invention has a much wider range of applicability. For example, the invention can be applied to other operational and non-operational business areas such as manufacturing, financial services, telecommunications, insurance services, high technology, retail, consumer products, and the like.

In a specific embodiment, the present invention provides a method for loading data into a datamart. The method includes identifying business data in a first format from a real business process and identifying a desired second format. The method includes designing a transformation algorithm that transforms the business data in the first format into the second format and implementing the transformation algorithm in computer executable code. The method includes running the computer executable code on business data in the first format and generating business data in the second format and storing the business data in the second format in a datamart.

In an alternative specific embodiment, the present invention provides a method for processing data associated with datamarts. The method includes identifying business data in a first format from a real business process and providing a second format for the business data. The method also includes designing a transformation process characterized to convert the business data in the first format into the second format and implementing the transformation process in computer executable code. The method executes the transformation process using a scheduler process and runs the computer executable code on business data in the first format to generate the business data in the second format. Preferably, the method stores the business data in the second format in at least a datamart. The scheduler process sequentially executes the computer executable code in a selected language by identifying one or more blocks in the computer executable code, determining dependencies between the one or more blocks in the computer executable code, and executing a selected block only after all blocks that depend on the selected block have been executed.

Many benefits are achieved by way of the present invention over conventional techniques. For example, the present technique provides an easy to use process that relies upon conventional technology. In some embodiments, the method provides for improved method for processing data for a datamart. The present invention provides an efficient and effective technique for integrating data into a datamart according to a specific embodiment. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for processing data are provided. More particularly, the invention provides a method and system for 1) automatic detection of change in the business processes to be analyzed; 2) accurate measurement of the performance of automatic classification of business process data; 3) automatic handling of semi-structured text in business process analysis; and 4) efficient and maintainable scripting of the data enrichment process. Business decisions generally require knowledge about properties of business entities related to the decision. Such properties can be inferred by an automatic classifier that processes data associated with the entity. Parts of the data may be human-generated or free form text. Other parts of the data may be machine-generated or semi-structured. It is beneficial to analyze both free form text and semi-structured text data for business process analysis. While the enrichment process can be programmed in a number of existing programming languages and data base query languages, it is advantageous to provide a specialized language for increased maintainability and faster development of the enrichment process. By way of example for the enabling features of such a language, we describe SQXML, a language developed by Enkata Technologies, Inc. for this purpose. The business decision can relate to marketing, sales, procurement, operations, or any other business area that generates and captures real data in electronic form. Merely by way of example, the invention is applied to processing data from a health care service provider. But it would be recognized that the invention has a much wider range of applicability. For example, the invention can be applied to other operational and non-operational business areas such as manufacturing, financial services, telecommunications, insurance services, high technology, retail, consumer products, and the like.

Figure 1:
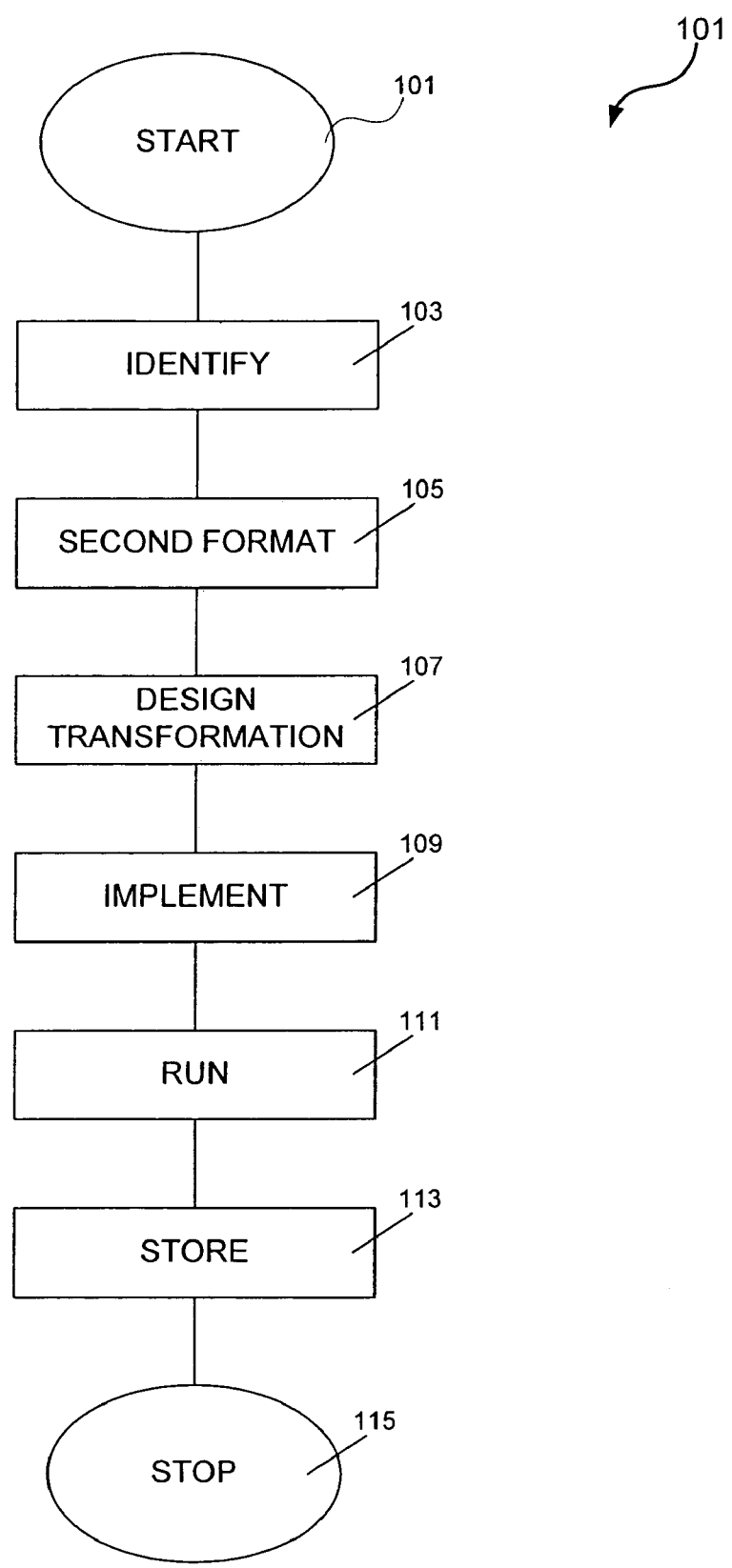
FIG. 1 is a simplified-flow diagram of a high level method for processing business data in a datamart according to an embodiment of the present invention.
Figure 2:
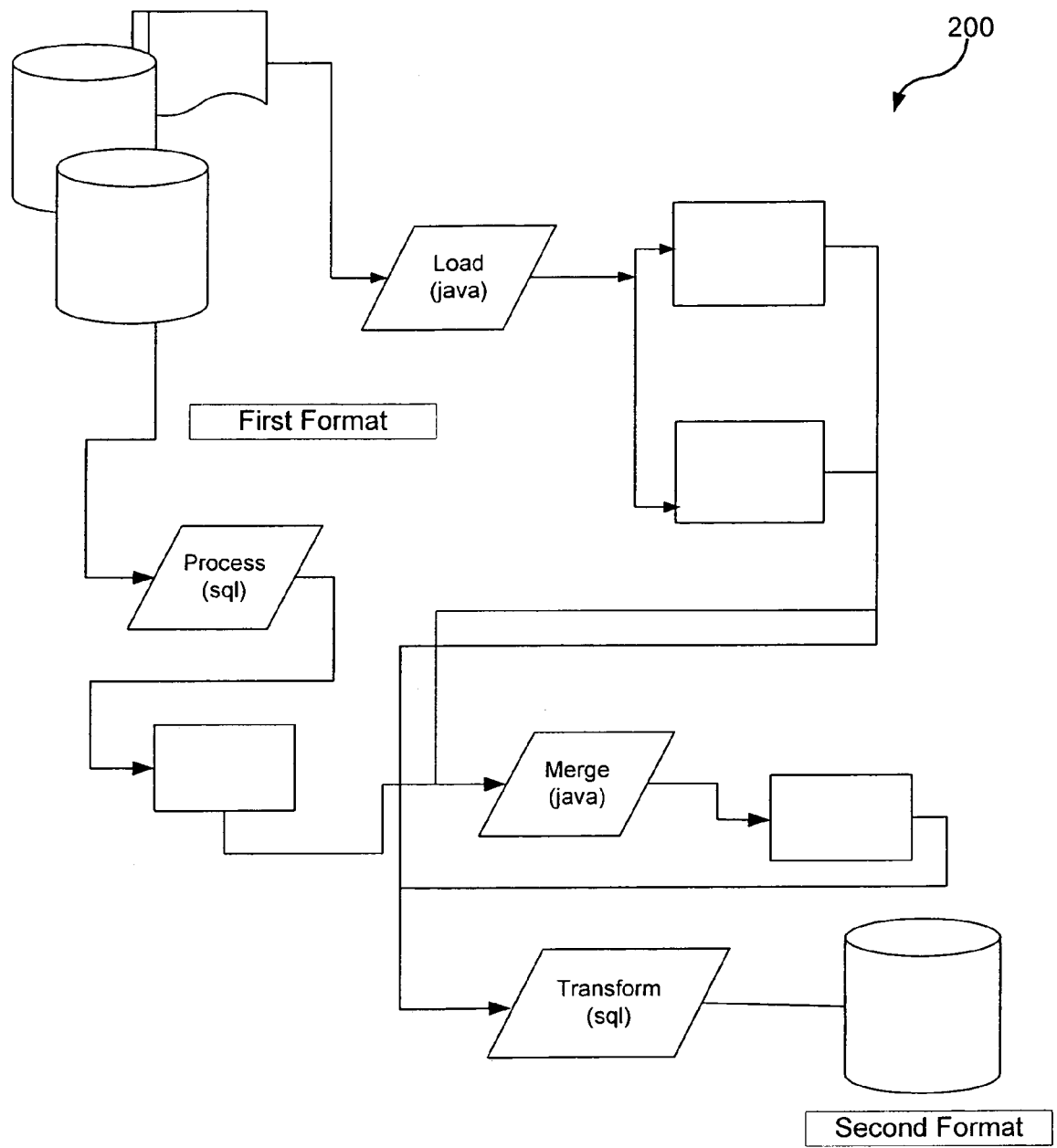
FIG. 2 is a more detailed flow diagram of a method for processing business data in the datamart according to an alternative embodiment of the present invention.

FIG. 1 is a simplified flow diagram 100 of a high level method for processing business data in a datamart according to an embodiment of the present invention. As shown, the method begins with start, step 101 and ends with stop, step 115. FIG. 2 is a more detailed flow diagram 200 of a method for processing business data in the datamart according to an alternative embodiment of the present invention. Here, the term "datamart" generally means a collection of data designed to support management decisions, arranged so as to make the queries that support such decisions easy and efficient, according to a specific embodiment. These diagrams are merely examples, which should not unduly limit the scope of the claims herein. One of ordinary skill in the art would recognize many variations, modifications, and alternatives. Further details of these methods are provided throughout the present specification and more particularly below.

Referring again to FIGS. 1 and 2, a method for processing data associated with datamarts may be outlined as follows:

1. identify business data in a first format from a real business process (step 103;

As an example, we consider data from a major health insurance provider. The purpose of the analysis is to determine what factors cause customers to choose the web for customer service as opposed to the call center. To satisfy our purpose, we identify several critical pieces of data:
- a) Call center records produced by the insurance provider's call center tracking software. These records arrive as a set of relational tables in a database.
- b) Web logs tracking web usage patterns. This data is in a text format specified by the World Wide Web Consortium.
- c) Claim data from the insurance provider's claim processing system. This data arrives as text files having been extracted from the provider's data warehouse.
- d) Customer data from the provider's master customer records. This data arrives as text files extracted from archives.

Figure 2A:
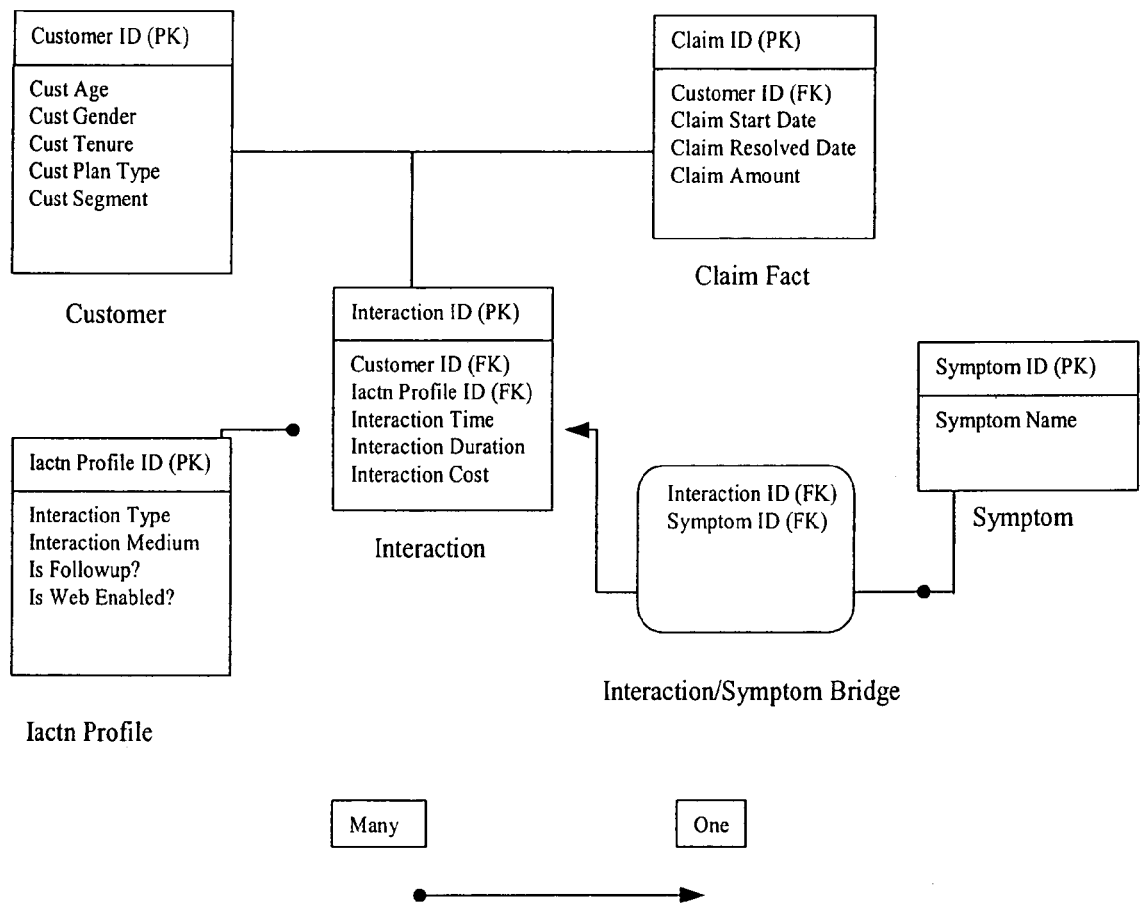
FIG. 2A is a simplified diagram of a database format according to an embodiment of the present invention.

2. provide a second format for the business data (the second format being suitable for the datamart) (step 105);

Our analysis software requires data to be formatted into a relational format known as a Star Schema. All data must be stored in relational tables, and all data must be properly related by keys. A simplified diagram of the Star Schema used for the second format is provided herein. See FIG. 2A, for example. Our schema includes two fact tables and three dimension tables. Specifically, we have the following:
- a) Interaction Fact contains one row per customer contact with the provider, be it over the phone or the web.
- b) Claim Fact contains one row per claim submitted by a customer.
- c) Interaction Dimension contains detailed information about the customer contact, including the medium (call vs web), contact type, and whether or not the contact required a follow-up call. There is exactly one interaction profile per interaction, but this dimension is unrelated to claims.
- d) Customer Dimension contains basic information about the customer, including demographics, insurance plan type, tenure, etc. Each interaction is made by exactly one customer, as is each claim.
- e) Symptom Dimension contains data about why the customer contacted the provider. A customer contact must have at least one symptom, but may have more. Symptoms are related only to interactions.

3. design a transformation process that converts the business data in the first format into the second format (step 107);

The transformation process occurs in three distinct phases:
I) Load the data into our transformation database.
II) Transform data into a Staging Star within the transformation database.
III) Populate the second format data (final Star Schema) from the Staging Star.

Step (I) involves processing each data source and then loading into our transformation database. The step varies by data source:
- The Call Center records are already in relational format, so we load them using the database's migration tools.
- The Web Logs need to be parsed before being loaded. We write a custom Web Log parser in Java, and connect it to our loader software to load the data.
- The Claim Data is in a simple flat file format, but it needs to be cleaned. We load it using the database's migration tools, and then apply cleaning transformations implemented as Blocks.
- The Customer Data is loaded similarly to the Claim Data.

Step (II) is the interesting portion. This step is implemented as a set of Blocks written mostly in SQL with some complex logic in Java. The scheduler automatically determines the order in which to run these Blocks based on their dependencies. It also allows us to avoid re-running completed blocks during incremental development. We group the Blocks into the Modules based on the following key functional areas:
- a) Interaction Unit. Call center data and web data are stored in two different systems at the provider's site. We must combine the two and unify them into a common format. Furthermore, a single customer contact can consist of multiple calls and/or multiple hits on the web. We combine all of these related activities into a single unit which we call the Interaction Unit. This complex set of transformations uses a combination of blocks in SQL and blocks in Java.
- b) Claim Fact. We process the claim data into the Claim Fact table. This step is mostly data cleanup and involves some aggregation of multiple source data rows describing the same claim.
- c) Dimension Processing. We process raw data for each dimension, such as the Customer, remove fields that are unnecessary for our analysis, compute extra fields based on business logic, and then normalize so that we store only one row per unique set of fields (to save space in the second format). During this phase, we also establish the links between dimension rows and the Interaction Unit and Claim Facts.
- d) Symptom Computation. The Symptom is something that we compute based on business rules. The business rules use a sequence of call center reason codes and web reason codes to determine the probable cause of the contact. We ended up iterating on the symptom computation algorithm with the insurance provider, so we made heavy use of the loader's ability to roll back and rerun portions of the load without rerunning the entire load.

Step (III) is largely automated and required little coding effort during the implementation. However, it takes a large amount of time (3 days) to run. To avoid rerunning a full 3 day load after any change to step (II) (especially the symptom computation logic), we used the loader's ability to identify changed tables and regenerate only those tables that depend on them. This cut the typical rerunning time for Step (III) down to half a day on average.

4. implement the transformation process in computer executable code (step 109);

The design described above for step (II) is implemented as a set of Blocks. Step (III) is also implemented as a set of Blocks, although we were able to generate these automatically from a description of the second format Star Schema.

5. executing the transformation process using a scheduler process (step 111);

We develop and execute the transformation process iteratively. The methodology is to develop a few small transformation units, implemented as Blocks, and then immediately test them by running the transformation process. Because the software is able to identify already completed blocks and not rerun them, we end up testing only the new or modified code at each stage. Upon completion of a Module, we verify the results, and then perform a complete roll-back and rerun on the entire Module. This roll-back and rerun executes the Module's code on a clean slate to protect against errors. The scheduler automatically determines which portion of the load process to roll-back and which portion to rerun, removing the need to drop temporary tables manually.

6. Run the computer executable code on business data in the first format to generate the business data in the second format (step 111):

a) The executable code is partitioned into unique execution units called "blocks".
b) Each block must create one or more output tables.
c) Each block may read from zero or more input tables.
d) A block may be executed as soon as its input tables are ready; either because they are part of the first format data or because they have been created by another block.
e) The process keeps executing blocks until all data in the second format has been generated.

Before kicking off the final load, we perform a complete roll-back of the data. This way we start with the raw first format and avoid problems caused by errors that may have inadvertently been introduced during the incremental development process. The ability of the scheduler to restart in case of errors is critical here, because the load takes approximately one week to run to completion and any number of failure situations can occur. We had a number of servers fail due to overheating, but were able to quickly pick up the load from the point of failure once the servers were restarted.

7. store the business data in the second format in at least a datamart (step 113);

Each block creates one or more tables when it completes. The blocks that create and populate the second format (Star Schema) tables are included in the load process, so that by the time the load process has finished, the data is fully present in the second format.

The above sequence of steps provides a method according to an embodiment of the present invention. As shown, the method uses a combination of steps including a way of processing information for a datamart according to an embodiment of the present invention. Other alternatives can also be provided where steps are added, one or more steps are removed, or one or more steps are provided in a different sequence without departing from the scope of the claims herein. Certain details of the present method can be found throughout the present specification and more particularly below.

Figure 3:
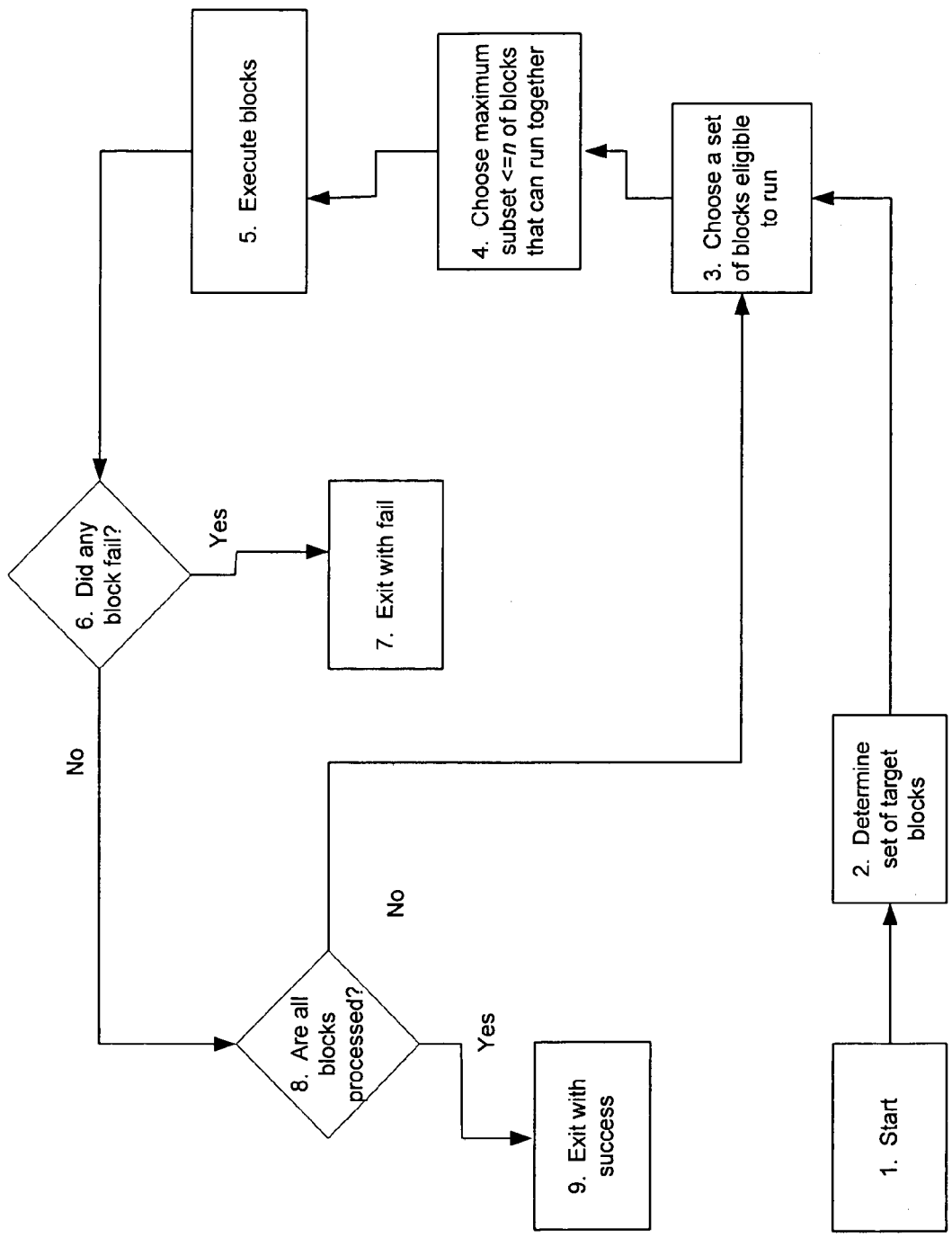
FIG. 3 is a simplified flow diagram of activities performed by the loader while running an SQXML script according to an alternative embodiment of the present invention.

FIG. 3 is a simplified flow diagram of activities performed by the loader while running an SQXML script according to an alternative embodiment of the present invention. As shown, the method includes steps of start (step 1), determine set of target blocks (step 2), choose a set of blocks eligible to run (step 3), choose maximum subset <=n of blocks that can run together (step 4), execute blocks (step 5), and other steps. A decision step 6 determines if any block failed. If yes, the method exits with the fail, which is step 7. Alternatively, the method goes to another decision step (step 8) to determine if all blocks have been processed. If so, the method returns to step 3. Alternatively, the method exists with success, step 9. Certain descriptions of these steps can be found throughout the present specification and others interpreted by one of ordinary skill in the art.

The above sequence of steps provides a method according to an embodiment of the present invention. As shown, the method uses a combination of steps including a way of processing information for a datamart according to an embodiment of the present invention. Other alternatives can also be provided where steps are added, one or more steps are removed, or one or more steps are provided in a different sequence without departing from the scope of the claims herein. Certain details of the present method can be found throughout the present specification and more particularly below.

According to a specific embodiment of the present invention, specific programming language and examples have been provided. These examples have been listed below using certain computer languages. Of course, one of ordinary skill in the art would recognize other variations, modifications, and alternatives.

1. SQXML

SQXML is a language for writing data transformations, based on a combination of SQL, XML and Java. It is a declarative language, unlike SQL scripts and ETL tool execution plans, which are procedural in nature. SQXML code consists of marked-up snippets of SQL interspersed with callouts to Java classes. This code is not executed sequentially, but is scheduled and executed selectively by a scheduler based on table dependencies inherent in different parts of the script, known as blocks. SQXML is aimed at the development and execution of complex data transformations on large data set; its development features automate a large number of tedious, error-prone tasks that usually crop up while developing traditional SQL scripts, while its automatic rollback and recovery features aid the user in recovering a long-running process from any error. SQXML also 1 includes a refresh feature that automates much of the maintenance associated with keeping transformed data up-to-date as input data and transformation scripts change. Finally, being an XML-based language, SQXML can be mated to XSLT transformations to produce a powerful meta-query language capable of automating tasks from a multiple-file data load to a complete set of data warehouse transformations.

Figure 5:
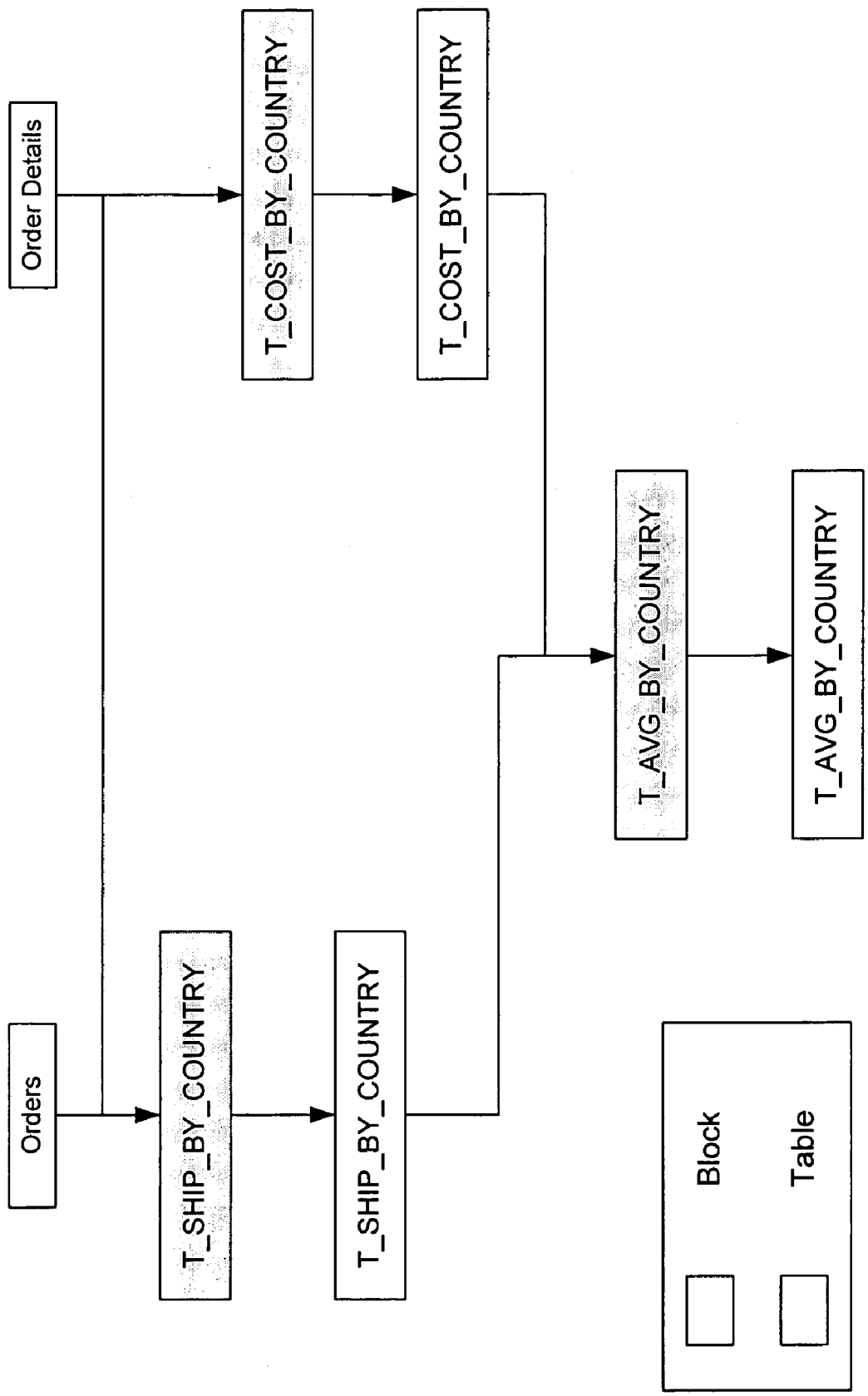
FIG. 5 is a simplified block-sequence diagram (including tables) for the example in the text (section "Basic Syntax") according to an embodiment of the present invention.
Figure 6:
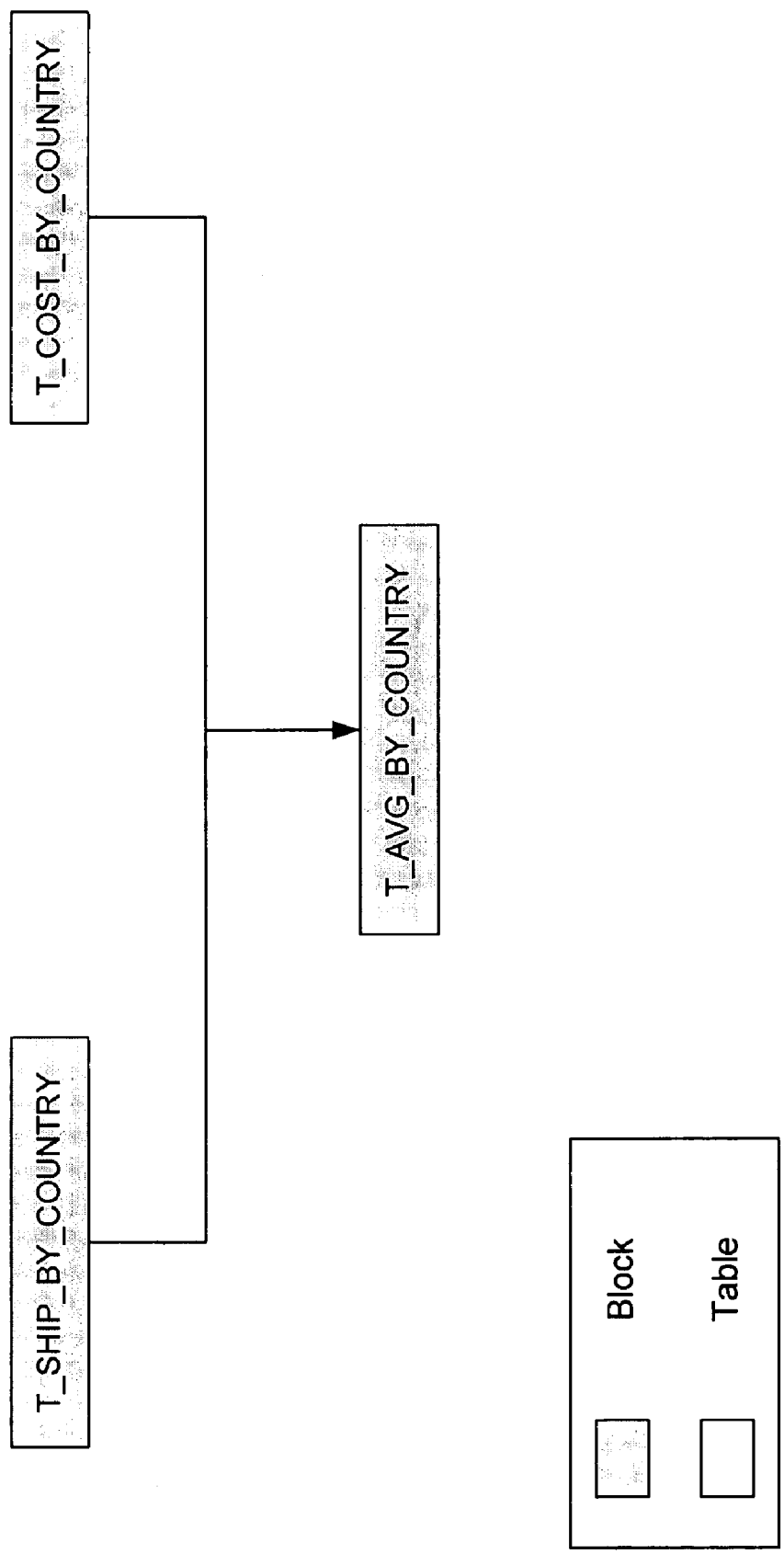
FIG. 6 is a block-sequence diagram for the example in the text (section "Basic Syntax"), but simplified to show the dependencies between blocks only (This is the graph used by the scheduler to determine which blocks to run) according to an embodiment of the present invention.

1.1 Basic Syntax (Refer to Examples in FIGS. 5 and 6, which are Merely Illustrations that should not Unduly Limit the Scope of the claims Herein.)

Most SQXML scripts look like snippets of SQL embedded in XML, with a few elements of the SQL replaced by markups. The typical SQXML script is divided into a series of blocks, each of which contains one or more SQL statements:

```
<SQXML xmlns="http://www.enkata.com/SQXML">
    <block name="T_SHIP_BY_COUNTRY">
        <sql>
        select ShipCountry,
                count(*) as num_orders
            into <table name="T_SHIP_BY_COUNTRY" usage="output"/>
            from <table name="Orders"/>
            group by ShipCountry
        </sql>
    </block>
    <block name="T_COST_BY_COUNTRY">
        <sql>
        select o.ShipCountry,
                sum(od.Quantity * od.UnitPrice *
                    (1.0 – od.Discount)) as total_cost
            into <table name="T_COST_BY_COUNTRY" usage="output"/>
            from <table name="Orders" alias="o"/>,
                <table name="Order Details" alias="od"/>
            where o.OrderID = od.OrderID
            group by ShipCountry
        </sql>
    </block>
    <block name="T_AVG_BY_COUNTRY">
        <sql>
        select s.ShipCountry,
                c.total_cost / s.num_orders as avg_cost
            into <table name="T_AVG_BY_COUNTRY" usage="output"/>
```

-continued

```
        from <table name="T_SHIP_BY_COUNTRY"
    alias="s"/>,
            <table name="T_COST_BY_COUNTRY"
    alias="c"/>
        where s.ShipCountry = c.ShipCountry
    </sql>
  </block>
</SQXML>
```

Each block contains one or more statements, which are executed sequentially as part of block execution. The <sql> statement is the most common type of statement used in SQXML; it simply executes the SQL query embedded inside of the <sql> element (note that the embedded SQL may contain markups). Other statements include <transform> (to call out to Java code), <bulkload> (to load data stored in raw XML form), as well as a wide range of statements that mimic common database queries.

There are two important differences between the <sql> statement and a section of a traditional SQL script according to a specific embodiment. First, when using a <sql> statement, the query must write back into the database; raw select statements may not be used. Second, names of tables are replaced by markup expressions that name the table and indicate how it is to be used. Table markups help the SQXML loader determine which blocks depend on other block by looking at how they read from and write to tables.

The <table> markup supports three attributes:

name. Gives the name of the table. The SQXML loader automatically treats names with special characters using the name escaping syntax of the target DBMS.

alias. Supplies an optional alias for the table name when used in queries. Alias only applies to tables in FROM or JOIN clauses.

usage. Specifies how the table is to be used. If omitted, defaults to input. Here are the allowable values:

input: The statement reads from but does not change any data in the table. Tables in FROM or JOIN clauses should use this method.

output: The statement creates the table. Targets of CREATE TABLE and related statements should use this method.

modify: The statement writes to or modifies data in the table, but does not create it. Targets or INSERT, UPDATE, or DELETE statements should use this method.

temp: The statement creates the table, but this table is not used outside the scope of the block.

Table markups are used so that the SQXML parser does not need to interpret the SQL stored within <sql> statements; it uses <table> markups to determine how tables are to be used.

1.2 Loader Features

Traditional SQL script execution supports only one operation: run. One can create additional scripts to undo the effects of a load or to recover a load after errors, but this work must all be done by hand.

Traditional ETL tools enhance script execution by adding scheduling, partial execution, and workflow. Some will even send you e-mail if a load fails. Yet they support no built-in facility for undoing a load or for executing only the portion of code that is necessary to adapt to changes.

Figure 4:
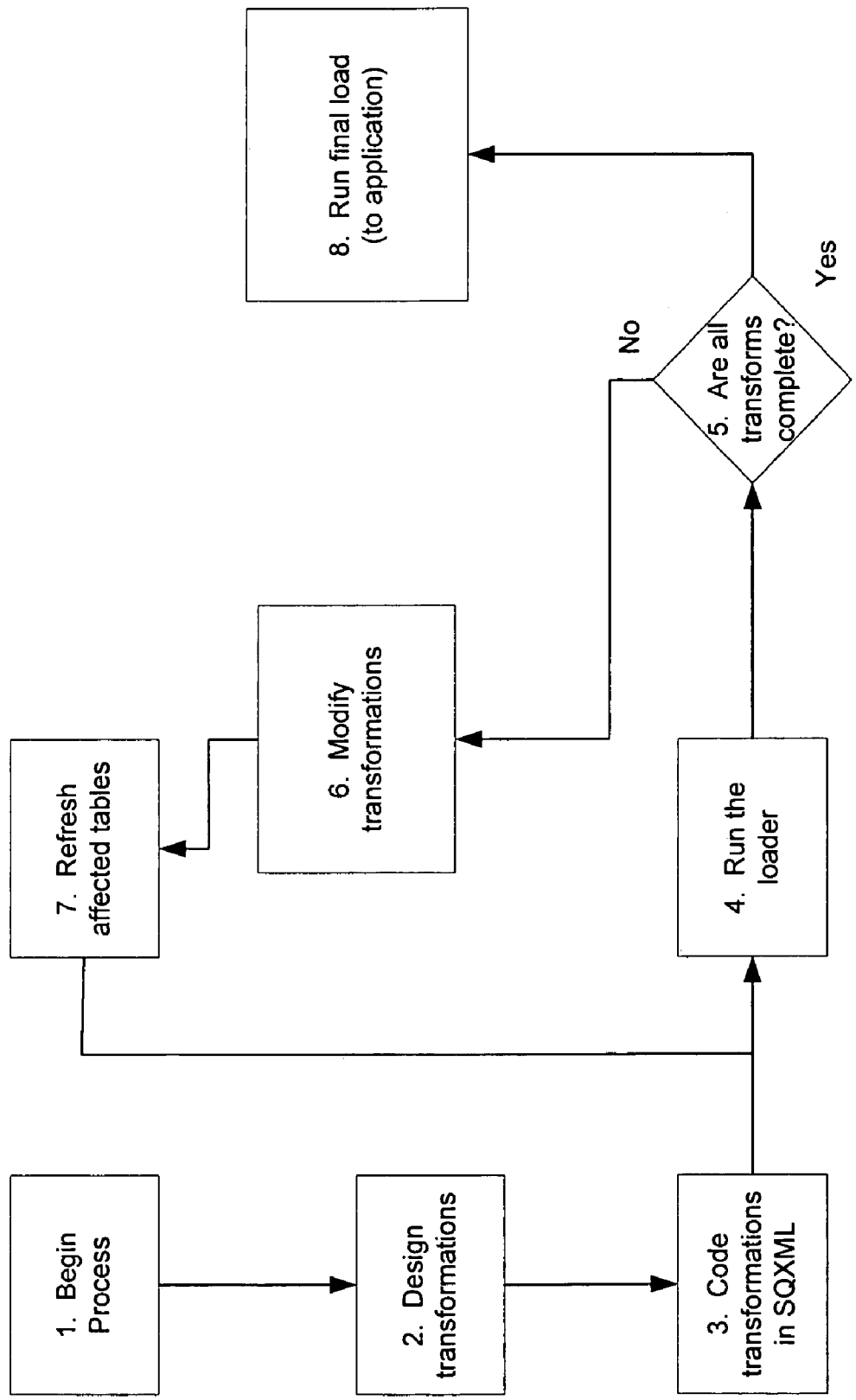
FIG. 4 is a simplified flow diagram of a typical set of activities performed by a human developer who uses SQXML according to an embodiment of the present invention.

The SQXML loader supports all of the standard features (full execution, partial execution) but also supports automatic rollback and refresh. As merely an example and referring to FIG. 4, a method for rollback and refresh for an SQMXL system can be described as follows:

1. step 1: begin process
2. step 2: the user designs the transformations
3. step 3: the user codes the transformations in SQXML
4. step 4: the user runs the loader
5. step 5: the user checks whether all transformations completed successfully
6. step 8: if yes, the user runs the final load
7. step 6: if no, then the user modifies the at least one of the transformations and encodes it in SQXML (or changes the encoding in SQXML only)
8. step 7: the user refreshes modified steps and steps depending on them refreshing includes any necessary rollbacks
9. the user then proceeds with step 4
10. other steps may be performed as desired.

All features are accomplished by tracking dependencies between different pieces of SQXML code and the tables they manipulate. What follows is a quick summary of the loader's features:

Forward Load. This is the most basic execution mode. The loader can execute all of or any portion of the code. Because of the loader's dependency tracking, this mode automatically keeps track of (and does not rerun) code that has already been run.

Backward Load. The loader can undo the effect of running any portion of the code. Backward load is fully-automated; no extra code needs to be written to make it work.

Targeted Load. The loader can be asked to "target" specific tables (much like a makefile). The loader will then run the minimal code that is necessary to create and load the targeted tables based on the current state of the database.

Refresh. The loader can flag a table as changed, and then automatically invalidate all tables that depend on the changed table so that they will be regenerated the next time a forward load is run.

Update. The loader can detect scenarios where portions of the data have changed, yet the transformation outputs based on those tables have not been updated. The loader can then automatically invalidate all out-of-date tables so that they will be regenerated the next time a forward load is run.

1.3 Block Sequencing

All of the loader's unique features are based on the concept of Blocks according to a specific embodiment. A Block is a self-contained transformation unit. It defines (and reads from) distinct inputs, performs some internal function, and creates (and writes to) distinct outputs. A block may utilize temporary storage while it executes, but it is expected to have no side effects. To be considered a block, a snippet of SQL code must satisfy the following four rules:

A Block must define at least one output.
A Block may not modify anything that is not its output.
A given object may be the output of at most one Block.
A table declared as temporary by one Block may not be the output of any Block.

Based on these rules, one can construct a directed acyclic graph linking blocks and database objects. Because a block may not partially depend on another block, this graph can be simplified into a dependency graph containing only blocks, where an arc from block A to block B indicates that A depends on the outputs of B.

The block scheduler takes as input a set of target blocks, which is a subset of the set of all blocks. Blocks must be executed in an order such that no block is executed before all of the blocks it depends on have completed. Execution is complete once all target blocks have been run.

The scheduling algorithm runs in a loop doing the following:
1. Find a set of blocks that are eligible to be run. A block is eligible to be run if all blocks on which it depends have completed.
2. Choose n eligible blocks to run, subject to constraints. Certain constraints (typically resource conflicts) prevent specific blocks from being run together. The value of n depends on the degree of parallelism desired by the user.
3. Execute the chosen blocks (in separate threads).
4. When a block finishes, check for termination. If any block failed, exit with a failure. If all target blocks have completed successfully, execute with success. If neither, go back to step 1.

Note that the correct choice of blocks in step 2 is an NP-complete problem. For our implementation, we simply pick the first n blocks from the eligible list that do not conflict with each other.

In SQXML, the inputs and outputs manipulated by blocks are typically tables, although other database objects (indices and views) are supported.

1.4 Invalidation, Refreshing, and Updating

All loader features are implemented by tracking three pieces of information:
1. The dependency graph on blocks and tables
2. The current state of the database, including the existence or non-existence of specific database objects. This state is obtained from the database's system catalog.
3. The loader-maintained table I LOAD BLACKLIST.

The loader checks state while it is searching for blocks that are eligible to be run. Recall that to be eligible to be run, all of a block's inputs must exist and not be invalid. The check is implemented by first locating the input tables in the system catalog. If they are all found, the loader then makes sure that none of the tables are listed on I LOAD BLACKLIST. The interpretation of I LOAD BLACKLIST is that any table listed there is suspected (or known) to be invalid.

The loader updates the state during and after block execution. After the scheduler nominates a block for execution but before the loader executes its code, all output tables of the block are both dropped (if they already exist) and added to I LOAD BLACKLIST. The execution of the block's code then naturally updates the database's system catalog through create table and other statements. Once the block's code successfully terminates, all of its output tables are removed from I LOAD BLACKLIST. This removal only occurs if the block successfully terminates, so that a block that fails for any reason (including a control-C from the user) will result in its outputs being treated as invalid.

By tracking this information, the loader always adapts itself to the current state of the load. It will never attempt to rebuild tables that are correctly populated, but will not hesitate to rerun code to recreate tables that are invalid.

Advanced loader features (refresh and update) are implemented by writing directly to the I LOAD BLACKLIST table. When the loader is told to refresh a table, it finds all tables that depend (directly or indirectly) on that table through the block dependency graph. Then it adds all such tables to I LOAD BLACKLIST, outputting their names. This feature not only causes the next load to re-create the out-of-date tables, but also gives the end-user (or administrator) a list of tables that are potentially affected by a change.

Update is also implemented using I LOAD BLACKLIST. In this case, the loader looks for blocks that have at least one input table that is newer than at least one output table. If this condition holds, the table and all of its direct and indirect dependents are marked as invalid (added to I LOAD BLACK-LIST) and displayed. This feature not only causes the next load to re-create the tables, but also gives the end-user (or administrator) a list of tables that are out-of-date.

1.5 Programmatic Transformations

Because SQXML is built on SQL, as a transformation language it has all the power of SQL, which is extensive. However, there are a number of tasks for which SQL is a poor choice. Therefore, SQXML allows end-users to write transformations in a procedural programming language (such as C++ or Java) and plug them into SQXML. These transformations may participate in blocks just like any other SQXML statement.

Our reference implementation supports programmatic transformations written in the Java language. As merely an example, the Java transformations can be Java Classes such as those provided in the com.enkata.api.ITransform interface, but can be others. A Java transformation is given JDBC access to its input table(s), and provided with an object to which to write output data. Although Java transformation code maintains the illusion of a direct write-back connection to the database, data is in fact bulk-loaded using the appropriate native utility for the target DBMS. Synchronization between the JDBC input data and bulkloading process is obtained through a set of producer-consumer classes.

1.6 Reusable Components

To assist development of large data transformation projects, SQXML includes a facility for writing reusable transformation components. A reusable component is like a template; it defines a generic piece of SQXML that can be later instantiated (with different parameters) in more than one place in the SQXML code. Although theoretically any template-processing language could be used, our reference implementation uses XSLT (eXtensible Stylesheet Language Transformations). A component author can write a generic piece of SQXML using XSLT. A transformation developer can instantiate the generic template by writing a block of XML in a namespace chosen by the transformation author.

Here is an example of a call to a component that normalizes a table by a set of columns:

```
<normalize
    xmlns="http://www.enkata.com/SQXML/transforms/normalize"
    table="MY_TABLE"
    output="MY_TABLE_NORM"
    map="MY_TABLE_MAP">
        <column name="my_column_1"/>
        <column name="my_column_2"/>
        <column name="my_column_3"/>
</normalize>
```

The developer does not need to know how the normalize component is implemented; he or she only needs to know the format of its expected input data.

1.7 SQXML and XSLT

SQXML is designed not only to be written by hand, but also to be easily generated programmatically. Because SQXML is implemented in XML, it is particularly easy to generate it using an XSLT stylesheet. SQXML includes two built-in methods to combine SQXML and XSLT:
1. Write an XSLT stylesheet that generates an entire SQXML script based on an input XML document. Typically the input XML is some sort of metadata representation, and the output SQXML script takes some action based on the metadata. Using this approach, it is common to have many different stylesheets that all operate on the same XML metadata.

2. Write a reusable plugin in XSLT. Reusable plugin XSLT transformations generate fragments of SQXML instead of complete SQXML documents. The XML on which they operate may be embedded directly into an SQXML script. When the SQXML parser detects a reusable plugin, it invokes its XSLT transformation on the embedded XML and replaces the embedded XML with the result of the transformation (in-line).

A large portion of the process that loads data into the datamart. As merely an example, such datamark can be the Enkata Action Center Datamart of the present assignee implemented in XSLT-driven SQXML, among others. The stylesheets representing the load are driven by a repository of XML-based metadata files that define certain and/or all EAC tables, their relationships, and how data is to be loaded. Of course, there can be variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for loading data into a datamart, the method comprising:
   identifying business data in a first format from a real business process;
   identifying a desired second format;
   iteratively designing a transformation algorithm that transforms the business data in the first format into the second format, by,
      (i) designing a first set of transformations,
      (ii) implementing the first set of transformations in computer executable code in a form of a declarative language;
      (iii) sequentially executing the computer executable code on business data in the first format and generating business data in the second format, by,
         identifying blocks in the code,
         determining dependencies between the blocks, and
         executing a particular block only after all blocks upon which that particular block depends have been executed;
      (iv) recording of any missing transformations or other problems;
      (v) designing an augmented and improved set of transformations; and
      repeating steps (i)-(v) more than once; and
   storing the business data in the second format in a datamart; and
   indicating to a user a change in the real business process based upon the business data in the second format.

2. The method in claim 1 wherein augmentation and improvement is iterated more than once.

3. The method in claim 1 wherein transformations coded in the declarative language are executed by a scheduler.

4. The method in claim 1 wherein blocks are explicitly delineated in the declarative language by the programmer.

5. The method in claim 1 wherein sequentially executing to computer executable code comprises identifying a set of blocks, each block not having any dependency on the other blocks in the set, and each block not having any dependency on a so far unexecuted block, and executing these blocks together.

6. The method in claim 1 wherein a parallel computer architecture is used to execute two or more blocks simultaneously.

7. The method in claim 1 wherein the dependencies include dependencies of tables of a relational database.

8. The method in claim 3 wherein the scheduler can roll back each block by undoing all changes it made when executing this block.

9. The method in claim 1 wherein transformations can be SQL statements.

10. The method in claim 1 wherein transformations can be written as programs in a turing equivalent programming language.

11. The method in claim 9 wherein the programming language is JAVA.

12. The method in claim 3 wherein the scheduler can be instructed to only execute transformations that write to a user-specified set of output tables.

13. The method in claim 3 wherein a specific table can be flagged as changed and the scheduler can be instructed to regenerate the flagged table and all tables that depend on it.

14. The method in claim 3 wherein the scheduler does not regenerate a table that has not changed since the last load.

15. A method for processing data associated with datamarts, the method comprising:
   identifying business data in a first format from a real business process;
   providing a second format for the business data;
   iteratively designing a transformation process characterized to convert the business data in the first format into the second format, by;
      (i) designing a first set of transformations,
      (ii) implementing the transformation process as the first set of transformations in computer executable code as a declarative language;
      (iv) executing the transformation process using a scheduler process;
      (v) running the computer executable code on business data in the first format to generate the business data in the second format;
      (vi) identifying at least one error;
      (vii) designing a second set of transformations based upon information from at least the one error; and
      repeating steps (i)-(vi); and
   storing the business data in the second format in at least a datamart; and
   indicating to a user a change in the real business process based upon the business data in the second format;
   whereupon the scheduler process sequentially executes the computer executable code in a selected language by identifying one or more blocks in the computer executable code, determining dependencies between the one or more blocks in the computer executable code, and executing a selected block only after all blocks that depend on the selected block have been executed.

16. The method of claim 15 wherein the scheduler process identifies a set of blocks, each of the blocks not having any dependency on any of the other blocks in the set of blocks, and each of the blocks not having any dependency on a so far unexecuted block, and executing the blocks without any dependency in parallel and/or sequentially.

17. The method of claim 15 wherein at least two or more blocks are executed in parallel using a parallel computing process.

18. The method of claim 15 wherein the dependencies include one or more dependencies of one or more tables of a relational database.

19. The method of claim 15 wherein the scheduler process rolls back one or more executed blocks by undoing all changes made to the one or more executed block.

20. The method of claim 15 wherein transformation process comprises one or more SQL statements.

21. The method of claim 15 wherein transformation process is provided in written form as a higher level programming language.

22. The method of claim 15 wherein the programming language is JAVA.

23. The method of claim 15 wherein the scheduler process selectively executes one or more transformations to write to a relational database table.

24. The method of claim 23 wherein the relational database table can be flagged as changed; and wherein the scheduler process regenerates the flagged table and one or more tables that depend on the flagged table.

25. The method of claim 15 wherein the scheduler process does not regenerate a table associated with one of the blocks if an input table has not changed for the one block.

* * * * *